US006959478B2

(12) United States Patent
Chen

(10) Patent No.: US 6,959,478 B2
(45) Date of Patent: Nov. 1, 2005

(54) SHOCKPROOF SPINDLE

(76) Inventor: Ting-Kuang Chen, 4F, No. 14-2, Industrial Rd., 1, Industrial Dist, Ping-Chen City, Taoyuan (TW)

( * ) Notice: Subject to any disclaimer, the term of this patent is extended or adjusted under 35 U.S.C. 154(b) by 0 days.

(21) Appl. No.: 10/699,547

(22) Filed: Nov. 1, 2003

(65) Prior Publication Data

US 2005/0092503 A1 May 5, 2005

(51) Int. Cl.[7] .................................................. B23P 11/00
(52) U.S. Cl. ............................ 29/435; 29/451; 29/428; 173/1; 173/93.5
(58) Field of Search ................................ 173/104, 123, 173/210, 211, 93, 92.5, 92.1; 29/428, 435, 29/451

(56) References Cited

U.S. PATENT DOCUMENTS 4,098,351 A * 7/1978 Alessio ........................ 173/13
4,658,912 A * 4/1987 Rohm ........................ 173/104
4,934,040 A * 6/1990 Turchan ...................... 29/566
5,025,869 A * 6/1991 Terunuma et al. ............ 173/98
5,239,752 A * 8/1993 Larimer ................. 29/898.061
5,451,127 A * 9/1995 Chung ......................... 408/20
5,625,511 A * 4/1997 Brooks et al. ........... 360/99.08
5,735,113 A * 4/1998 Cadenhead, Sr. ............ 57/306
5,868,435 A * 2/1999 Bartholomew ............... 285/23
6,139,228 A * 10/2000 Longo ........................ 408/240
6,202,759 B1 * 3/2001 Chen ........................... 173/48
6,524,166 B1 * 2/2003 Bergquist et al. ............. 451/28
6,666,284 B2 * 12/2003 Stirm .......................... 173/97

* cited by examiner

*Primary Examiner*—Scott A. Smith
*Assistant Examiner*—Brian Nash

(57) ABSTRACT

A shockproof spindle includes a spindle inserted into an elastomer having a compressible structure, and a sleeve having a hollow cylinder, sequentially. The sleeve caps the elastomer while the elastomer is pressed on the top of the base fixed at the bottom end the spindle to expose the chute of the spindle. The ball is then disposed in the chute of the spindle and the chute of the sleeve. After the sleeve is released to return the elastomer to its normal state, the sleeve, the elastomer and the spindle are held together by the ball which is retained in the chutes of the spindle and the sleeve. A C-shaped plate is then inserted between the elastomer and the base.

1 Claim, 3 Drawing Sheets

SHOCKPROOF SPINDLE

BACKGROUND OF THE INVENTION

1. Field of the Invention

The present invention relates to a structure of shockproof spindle, and more particularly to a structure that has a C-shaped washer, which has an opening to enable a new assembly process of the structure of spindle. Because of the new assembly process, the structure can be modified to prevent falling of a ball guided in the structure under impact. In addition, the thickness of the washer can be increased also, and that can improve the impact absorbing efficiency of the structure.

2. Description of Related Art

A conventional structure of shockproof spindle is installed in an electric tool, such as an electric drill, for drilling cement wall, and has impact absorbing function. The structure absorbs the impact when a tool installed on the end of the spindle is shocked against the workpiece during the operation of the tool. Since the structure works smoothly, the damage or destruction of assembly precision, made by the impact, of the parts in the electric tool is avoided, and the structure is more compact and the operation period is increased.

Referring to FIG. 1, in a conventional structure of shockproof spindle, a spindle 1 is inserted through a washer 2, an elastomer 3, and a sleeve 4 sequentially. The sleeve 4 caps the elastomer 3 while the elastomer 3 presses on the top of a base 11 fixed at the bottom end of the spindle 1. Next, a ball 5 is positioned in a chute 41 defined in the sleeve 4, while the sleeve 4 is pushed down to compress the elastomer 3 until the ball 5 can be retained in a chute 12 of the spindle 1 tightly.

In addition to all of the above, the elastomer 3 held between the base 11 and the sleeve 4 absorbs impact energy when a tool installed on the end of the spindle 1 is shocked against the workpiece during the operation of the tool. Since the spindle 1 works smoothly owing to the effect of the elastomer 3, the operators work more easily, and the damage or destruction of assembly precision, made by the impact, of the parts in the electric tool is avoided.

Furthermore, because the ball 5 of the conventional structure of shockproof spindle can only be installed in the chute 41 of the sleeve 4 after all the other part assembly is finished, the elastomer 3 has to be short enough for the chute 41 of the sleeve 4 to be lower than the chute 12 for the installation of the ball 5. However, such a design of the elastomer 3 or the chute 41 of the sleeve 4 leads to the problems that the chute 41 is lower than the chute 12 of the spindle 1 under impact, and the ball 5 may fall out from the chute 12. These problems not only cause the spindle to lose function of impact absorbing but also destroy the transmission mechanism.

To overcome the shortcomings, the present invention provides a structure of shockproof spindle to mitigate the aforementioned problems.

SUMMARY OF THE INVENTION

In order to overcome the aforementioned problems of the conventional arts, the present invention presents an innovative structure of shockproof spindle and the method of assembling it. On the basis of inventor's practice according to the work, the present invention is useful, and it can solve the problems and limits of the conventional arts.

To achieve the above-stated object, a structure of shockproof spindle of the present invention comprises a spindle inserted through an elastomer, which is a compressible structure, and a sleeve, which is a hollow and circular cylinder, sequentially. The sleeve caps the elastomer while the elastomer is pressed on the top of the base fixed at the bottom end of the spindle to expose the chute of the spindle. The ball is then disposed in the chute of the spindle and the chute of the sleeve. After the sleeve is released from pressing the elastomer, the sleeve, the elastomer and the spindle are held together by the ball which is retained between the chutes of the spindle and the sleeve. A C-shaped plate is inserted between the elastomer and the base afterwards. With the above structure, the elastomer held between the base and the sleeve absorbs the impact when a tool installed on the end of the spindle is shocked against the workpiece during the operation of the tool.

The present invention has the following improvements. First, the assembly process of the present invention is improved because the washer is a C-shaped plate with an opening and can be installed after the spindle, the elasmoter and the sleeve are assembled and held together. As a result, the elastomer can be longer or have a stronger elastic force because there is no washer between the elastomer and the base when the elastomer is pressed to expose the chute of the spindle. The thickness of the washer can also be increased with this assembly process because the elastomer can be compressed upwards to make a room for the washer. The stronger elastic force of the elastomer, and the greater thickness of the washer which is also an elastic material improve the absorbing efficiency of the structure. Moreover, the ball is less likely to fall off the chutes and cause damage to the spindle structure because the additional thickness of the washer makes it more difficult to expose the chute of the spindle even if the elastomer is greatly compressed due to strong shock or impact.

BRIEF DESCRIPTION OF THE DRAWINGS

The invention will be better understood and other advantages will become apparent on reading the following description, given by way of non-limiting example and by virtue of the appended figure, in which.

DETAILED DESCRIPTION OF THE PREFERRED EMBODIMENT

Figure 1:
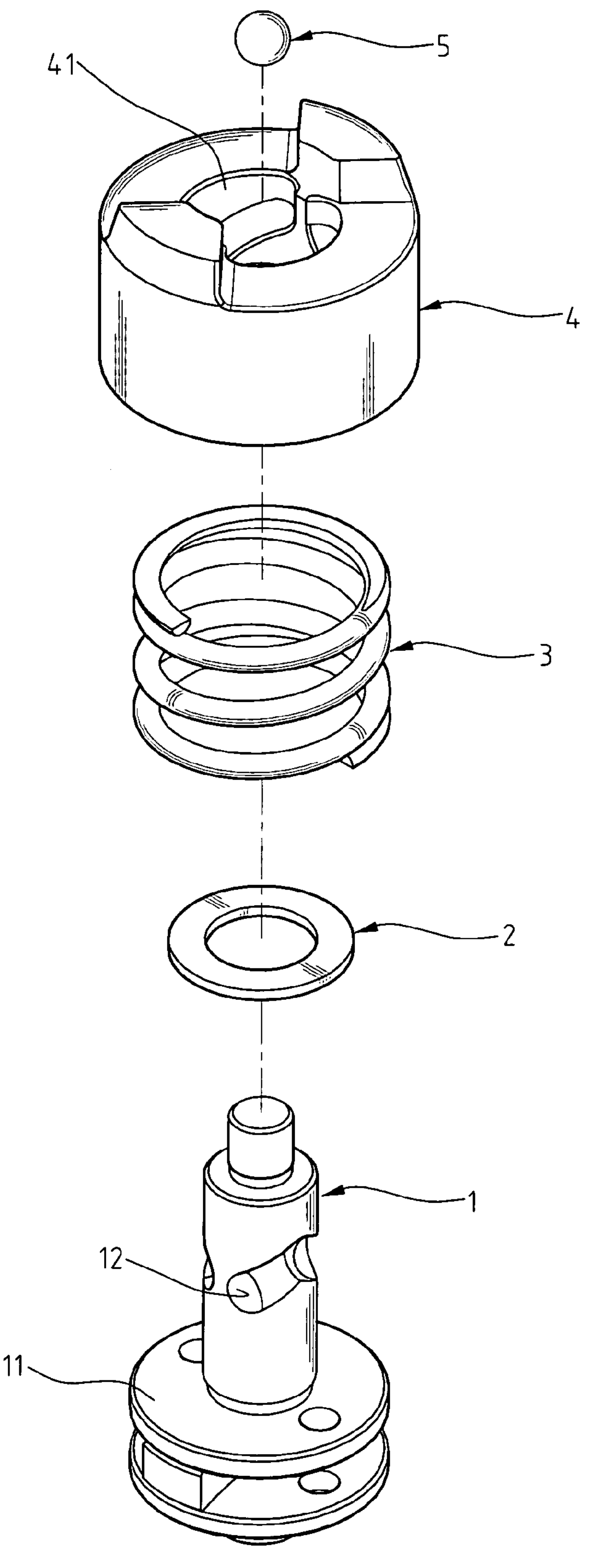
FIG. 1 (Prior Art)
FIG. 1 illustrates a perspective view of a conventional spindle structure in the prior art.
Figure 2:
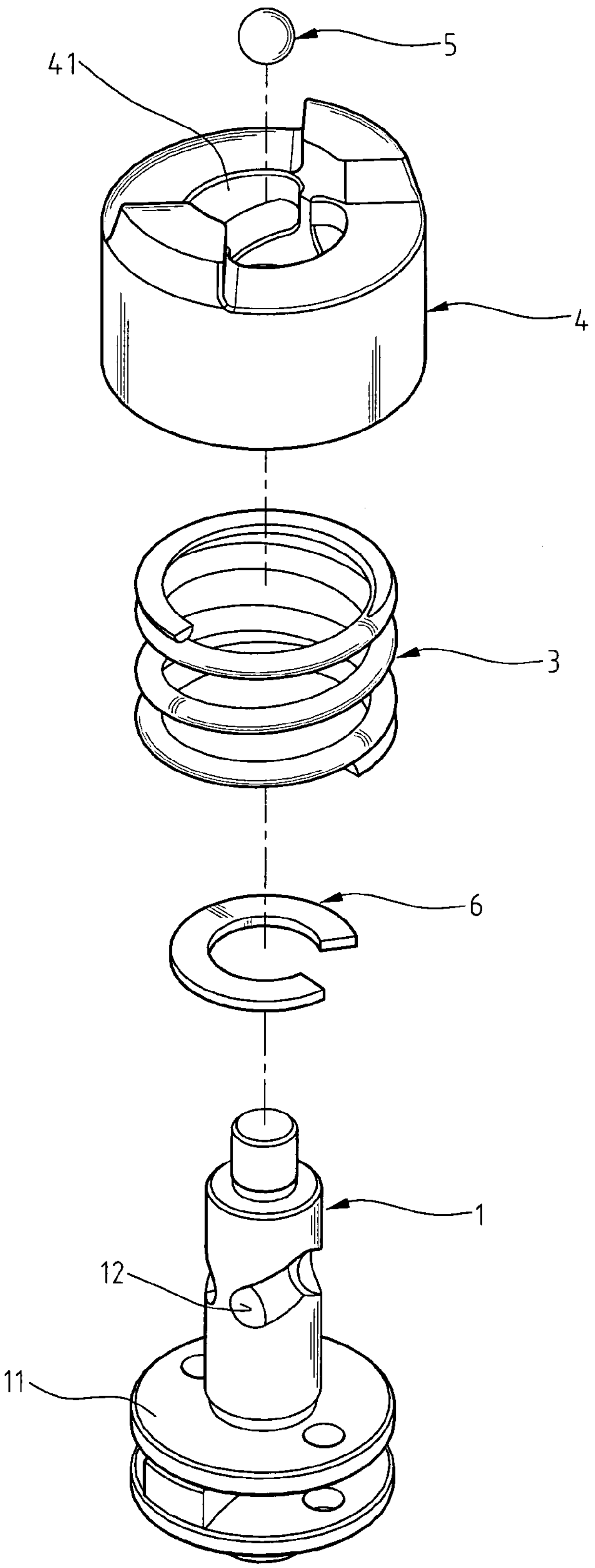
FIG. 2 illustrates a perspective view of a shockproof spindle in accordance with the present invention.
Figure 3:
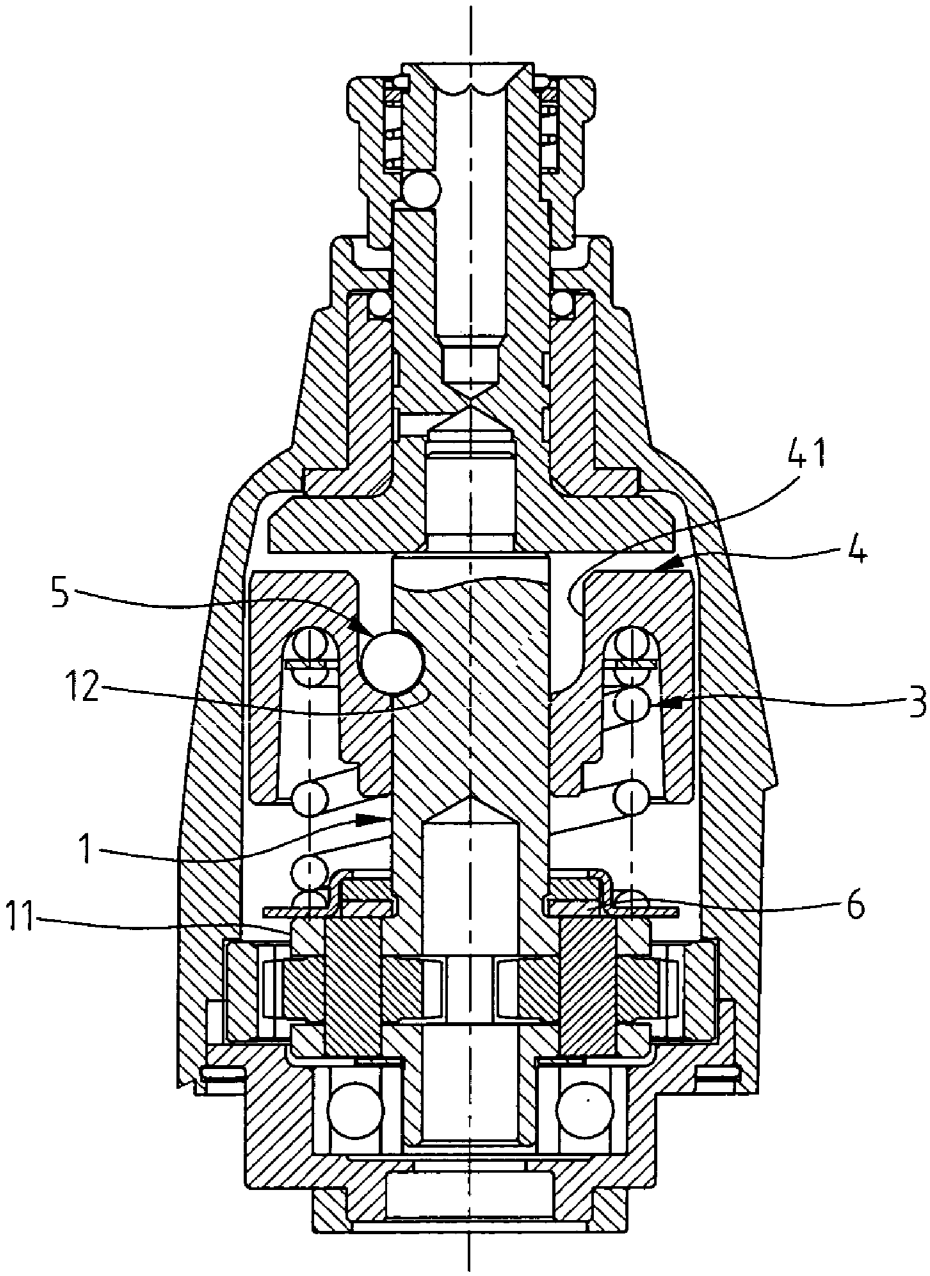
FIG. 3 illustrates a cross-sectional view of the shockproof spindle in accordance with the present invention.

Referring to FIGS. 2 and 3, a shockproof spindle in accordance with the present invention comprises a spindle 1, a washer 6, an elastomer 3, a sleeve 4, and a ball 5.

The spindle 1 is a cylinder which is installed coaxially on a base 11. The cylinder of the spindle 1 is formed with a chute 12 that is caved along the surface of the cylinder. The base 11 is also a cylinder and has an outer diameter which is greater than the diameter of the spindle 1.

The washer 6 is a C-shaped plate made by elastic material and has a sufficient thickness. The side opening of the C-shaped plate depends on the outer diameter of the spindle 1 and should be large enough for the spindle 1 to pass through the side opening.

The elastomer 3 is a compressible structure, such as a compressive spring. The elastomer 3 surrounds the spindle 1 and is placed above the upper face of the base 11.

The sleeve 4 is a hollow cylinder and has an inner surface forming an annular chute 41 that is caved along the inner surface of the upper port of the sleeve 4. The chute 41 holds a portion of the ball 5 inside, and another portion of the ball 5 is retained in the chute 12 of the spindle 1. The inner diameter of the chute 41 is designed according to the outer diameter of the spindle 1, and the lower port of the sleeve 4 can cap the upper port of the elastomer 3.

The assembly process of the shockproof spindle of the present invention will be described. Firstly, the spindle 1 is inserted into the elastomer 3 and the sleeve 4 sequentially, and the sleeve 4 caps the elastomer 3 while the elastomer 3 is pressed on the top of the base 11 fixed at the bottom end of the spindle 1. Next, the ball 5 is positioned in the chute 41 of the sleeve 4 which has been pushed down to compress the elastomer 3 until the ball 5 can contact the chute 12 of the spindle 1 tightly and is retained in the chutes of the sleeve 4 and the spindle 1. The elastomer 3 is then allowed to return to its normal state, and the spindle 1 is inserted into the C-shaped washer 6 through the side opening by positioning the C-shaped washer 6 between the elastomer 3 and the base 11. The washer 6 is thus clipped between the elastomer 3 and the base 11 and is thick enough to push the elastomer 3 upward and to raise the sleeve 4.

The structure of the shockproof spindle of the present invention, the position, and the maximum deformation of the elastomer 3 are designed to keep the ball 5 retained the chute 12 of the spindle 1 and the chute 41 of the sleeve 4 is never lower than the lowest position of the chute 12 of the spindle 1 after thee C-shaped washer 6 is inserted between the elastomer 3 and the base 11 of the spindle 1. The elastomer 3 can be longer or have a stronger elastic force compared to the prior arts because there is no washer betwween the elastomer 3 and the base 11 when the elastomer 3 is pressed to expose the chute 12 of the spindle 1 for installing the ball 5. The thickness of the C-shaped washer 6 can also be increased because the elastomer 3 can be compressed upwards to make a room for the washer 6. The stronger elastic force of the elastomer 3 and the greater thickness of the washer 6 which is also an elastic material improve the absorbing efficiency of the structure. Furthermore, the ball 5 is less likely to fall off the chutes to cause damage to the spindle structure because the additional thickness of the C-shaped washer 6 makes it more difficult to expose the chute 12 of the spindle 1 even if the elastomer 3 is greatly compressed due to strong shock or impact.

The elastomer 3 held between the base 11 and the sleeve 4 absorbs the impact when a tool installed on the end of the spindle 1 is shocked against the workpiece during the operation of the tool. Since the spindle 1 works smoothly owing to the effect of the elastomer 3, the operators work more easily, and the damage or destruction of assembly precision, made by the impact, of the parts in the electric tool is avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of assembling a shockproof spindle, comprising the steps of:

inserting a spindle into an elastomer, said spindle being formed with a first chute and having a base fixed at a bottom end, and said elastomer having a compressible structure;

capping said spindle and said elastomer with a sleeve, said sleeve having a hollow and circular structure with a second chute formed on an inner surface of said sleeve;

pushing down said sleeve to press said elastomer towards said base with said spindle being inserted through said sleeve to expose said first chute;

disposing a ball in said first chute and releasing said sleeve to allow said elastomer to return to a normal state with said ball being retained within said first and second chutes; and after said above mentioned steps, disposing a C-shaped plate between said elastomer and said base by inserting said spindle through a side opening of said C-shaped plate.

* * * * *